(12) United States Patent
Tomita et al.

(10) Patent No.: US 9,790,957 B2
(45) Date of Patent: Oct. 17, 2017

(54) AIR INTAKE DUCT STRUCTURE FOR CENTRIFUGAL FLUID MACHINE

(71) Applicant: MITSUBISHI HEAVY INDUSTRIES, LTD., Tokyo (JP)

(72) Inventors: Isao Tomita, Tokyo (JP); Masaki Tojo, Tokyo (JP); Takao Yokoyama, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 383 days.

(21) Appl. No.: 14/379,691

(22) PCT Filed: Feb. 26, 2013

(86) PCT No.: PCT/JP2013/054988
§ 371 (c)(1),
(2) Date: Aug. 19, 2014

(87) PCT Pub. No.: WO2013/129409
PCT Pub. Date: Sep. 6, 2013

(65) Prior Publication Data
US 2015/0050136 A1 Feb. 19, 2015

(30) Foreign Application Priority Data
Feb. 29, 2012 (JP) ................ 2012-044103

(51) Int. Cl.
*F04D 17/10* (2006.01)
*F04D 29/42* (2006.01)
(Continued)

(52) U.S. Cl.
CPC ... *F04D 29/4213* (2013.01); *F02M 35/10124* (2013.01); *F02M 35/10157* (2013.01);
(Continued)

(58) Field of Classification Search
CPC ............ F04D 29/4213; F04D 29/441; F02M 35/10118; F02M 35/10124
(Continued)

(56) References Cited

U.S. PATENT DOCUMENTS 1,887,873 A 11/1932 Hagen
1,991,660 A 2/1935 Collins
(Continued)

FOREIGN PATENT DOCUMENTS

CN 201334927 Y 10/2009
CN 102317594 A 1/2012
(Continued)

OTHER PUBLICATIONS

Notice of Allowance dated Sep. 2, 2016, issued in the corresponding Chinese Application No. 201380011346.5 with English Translation.
(Continued)

*Primary Examiner* — Justin Seabe
(74) *Attorney, Agent, or Firm* — Birch, Stewart, Kolasch & Birch, LLP

(57) ABSTRACT

An object is to provide an air intake duct structure for a centrifugal fluid machine, capable of swirling the fluid introduced into the impeller in the reverse direction to increase the pressure ratio when the flow rate is high and swirling the fluid in the forward direction to avoid a surging when the flow rate is low, as well as securing a wide operating range, without using mechanical means. The centrifugal fluid machine 1 includes an impeller 12 mounted to a rotation shaft and a housing 4 for housing the impeller 12. The air intake duct structure 10 is for directing a fluid "f" to a rotational center 12a of the impeller 12 housed in the housing 4 via an intake duct portion 4a of the housing 4 protruding in an axial direction of the rotation shaft, the fluid "f" flowing in a substantially orthogonal direction to a
(Continued)

rotational axis line 3. The air intake duct structure 10 comprises an inflow part 14 extending in the substantially orthogonal direction to the rotation axis line 3 and a transition part 16 connecting the inflow part 14 and the intake duct portion 14a of the housing 4. There is a virtual plane 20 orthogonal to the rotational axis line 3 and passing through a flow path cross-section of the inflow part 14, where an intersection 22 of the virtual plane 20 and the rotational axis line 3 is positioned within the transition part 16.

5 Claims, 17 Drawing Sheets

(51) Int. Cl.
    *F02M 35/10*         (2006.01)
    *F04D 29/44*         (2006.01)
    *F02B 39/16*         (2006.01)

(52) U.S. Cl.
    CPC ........... *F04D 17/10* (2013.01); *F04D 29/441* (2013.01); *F02B 39/16* (2013.01); *F05D 2250/51* (2013.01); *Y02T 10/144* (2013.01); *Y02T 10/146* (2013.01)

(58) Field of Classification Search
    USPC .................................................. 415/205, 206
    See application file for complete search history.

(56) References Cited

U.S. PATENT DOCUMENTS

| | | | |
|---|---|---|---|
| 6,520,738 B2 * | 2/2003 | Sheoran | B64D 33/02 415/205 |
| 7,093,589 B2 * | 8/2006 | Sorersen | F02B 37/00 123/25 A |
| 7,556,009 B2 * | 7/2009 | Niakan | F02B 27/00 123/184.21 |
| 2004/0096316 A1 | 5/2004 | Simon et al. | |
| 2007/0134084 A1 | 6/2007 | Zausner | |
| 2010/0061843 A1 | 3/2010 | Anderson et al. | |
| 2010/0221107 A1 | 9/2010 | Anschel et al. | |

FOREIGN PATENT DOCUMENTS

| | | |
|---|---|---|
| EP | 1 420 146 A1 | 5/2004 |
| JP | 60-190942 U | 12/1985 |
| JP | 2004-162716 A | 6/2004 |
| JP | 2007-154895 A | 6/2007 |
| JP | 2010-65681 A | 3/2010 |
| JP | 4464661 B2 | 5/2010 |

OTHER PUBLICATIONS

Decision to Grant a Patent effective Jun. 26, 2015 issued in corresponding Japanese Application No. 2012-044103 with an English Translation.

International Preliminary Report on Patentability and Written Opinion of the International Searching Authority (forms PCT/IB/338, PCT/IB/373, PCT/ISA/237 and PCT/IB/326), dated Sep. 12, 2014, for International Application No. PCT/JP2013/054988, with an English translation of the Written Opinion.

International Search Report and Written Opinion of the International Searching Authority (forms PCT/ISA/210, PCT/ISA/220 and PCT/ISA/237), dated May 21, 2013 for International Application No. PCT/JP2013/054988.

Extended European Search Report dated Sep. 25, 2015 issued in corresponding European Application No. 13754588.5.

Office Action dated Dec. 31, 2015 issued in the corresponding Chinese Application No. 201380011346.5 with an English Translation.

\* cited by examiner

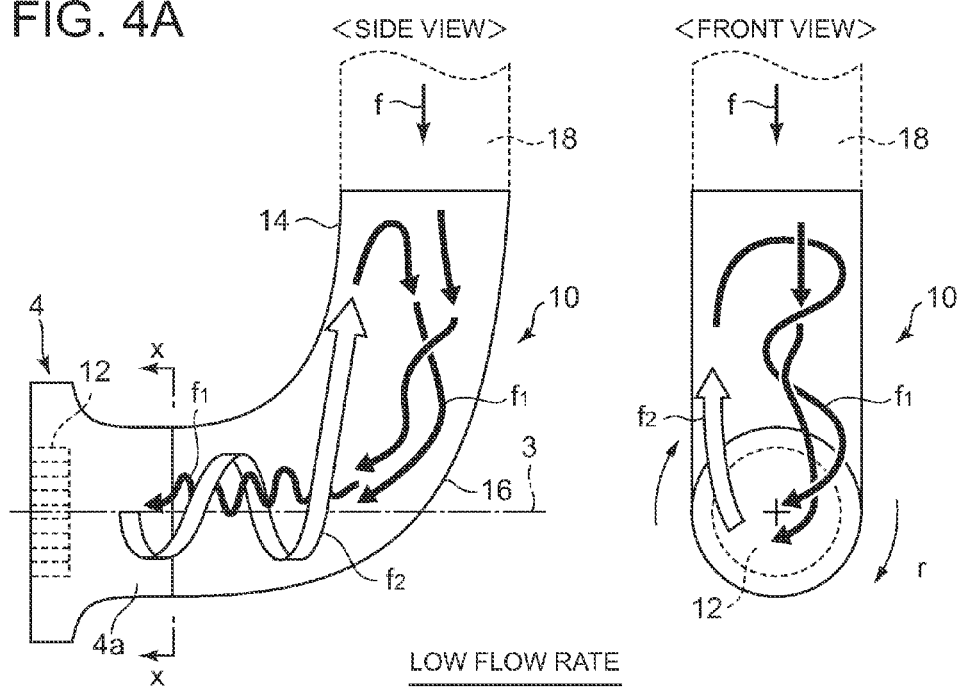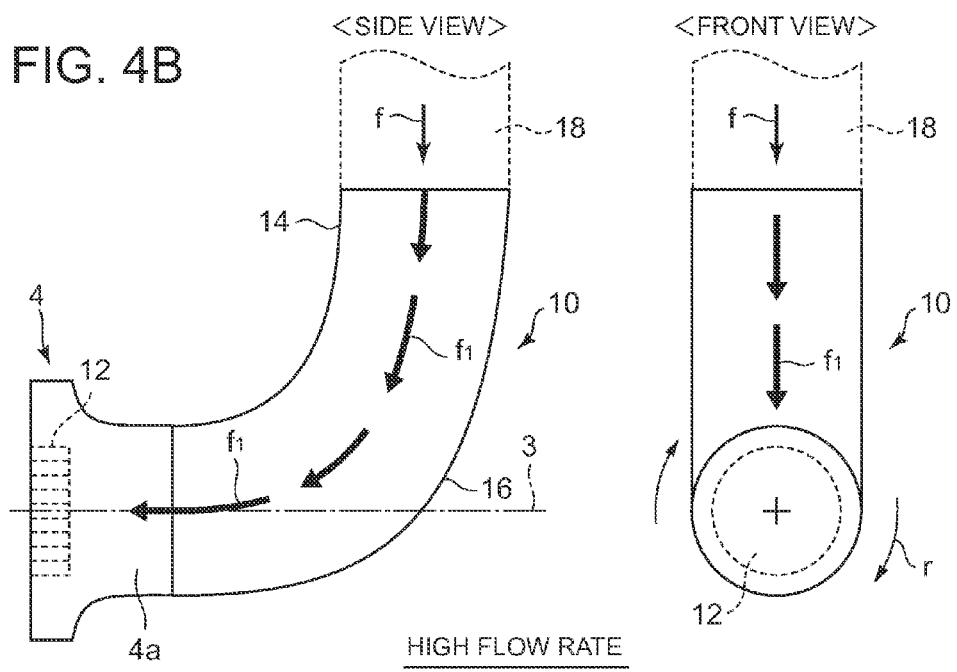

X-X

LOW FLOW RATE

HIGH FLOW RATE

AIR INTAKE DUCT STRUCTURE FOR CENTRIFUGAL FLUID MACHINE

TECHNICAL FIELD

This invention relates to an air intake duct structure for a centrifugal compressor, a mixed flow compressor, a centrifugal blower, and a mixed flow blower, each of which being a fluid machine, and which are hereinafter collectively referred to as a "centrifugal fluid machine".

BACKGROUND

A centrifugal compressor is used for a turbocharger or a turbo freezer installed on a vehicle or a ship. The centrifugal compressor includes an impeller rotating at high speed and utilizes centrifugal force to increase the pressure of a fluid. While a wide operating range is required for the centrifugal compressor, decrease in the flow rate of a fluid introduced into the centrifugal compressor leads to a surging, where the discharge pressure pulsates and the operation state becomes unstable, causing the centrifugal compressor to reach the operation limit. Thus, it is necessary to lower the limit flow rate which a surging occurs in order to secure a wide operating range for the centrifugal compressor.

In order to lower the above described limit flow rate, it is effective to swirl the fluid introduced into the impeller in the same direction as the rotational direction of the impeller (forward rotation) as shown in FIG. 13A. Herein, FIG. 13A is a graph showing the change in the performance characteristic of the compressor when the rotation speed is constant and the fluid introduced into the impeller is swirled in the forward direction. As it can be seen from FIG. 13A, when the fluid introduced into the impeller is swirled in the forward direction, the surge line moves toward the left side of the graph, lowering the limit flow rate at which a surging occurs. However, it is impossible to expand the operating range itself because the maximum flow rate also decreases when the fluid introduced into the impeller is swirled in the forward direction.

On the other hand, high pressure ratio is required when the flow rate is high. In order to achieve high pressure ratio, it is effective to swirl the fluid introduced into the impeller to a direction opposite to the rotational direction of the impeller (reverse rotation) as shown in FIG. 13B. Herein, FIG. 13B is a graph showing the change in the performance characteristic of the compressor when the rotation speed is constant and the fluid introduced into the impeller is swirled in the reverse direction. As it can be seen from 13B, when the fluid introduced in to the impeller is swirled in the reverse direction, the performance curve moves to the top-right side of the graph, increasing the pressure ratio. However, the surge line also moves to the right side of the graph when the fluid introduced into the impeller is swirled in the reverse direction, which narrows the operating range itself.

Patent Document 1 discloses a pre-whirl generating device for a centrifugal compressor of an automobile turbocharger, the pre-whirl generating device being capable of swirling the fluid introduced into the impeller in the reverse direction when the flow rate is high and in the forward direction when the flow rate is low by operating a variable mechanism constituted of an air deflection vane with an actuator and the like. According to the pre-whirl generating device of Patent Document 1, it is possible to increase the pressure ratio by introducing a reverse-swirl flow when the flow rate is high and to avoid a surging by introducing a forward-swirl flow when the flow rate is low, as shown in FIG. 14. Also, it is possible to secure a wide operating range because the maximum flow rate of the operating range is not lowered.

CITATION LIST

Patent Literature

Patent Document 1: JP4464661

SUMMARY

Technical Problem

However, the pre-whirl generating device of Patent Document 1 is a mechanical type device operating a variable mechanism using an actuator and the like, and thus has problems such as the increased size and cost of the device. Especially in an automobile turbocharger, there is a strong need for downsizing and cost-reduction. Therefore, it is not realistic to adopt a mechanical means.

The present invention was made in view of the problems of the prior art, and is to provide an air intake duct structure for a centrifugal fluid machine, capable of: swirling the fluid introduced into the impeller in the reverse direction to increase the pressure ratio when the flow rate is high; and swirling the fluid in the forward direction to avoid a surging when the flow rate is low, as well as securing a wide operating range, by improving the shape and the like of the air intake duct and without using a mechanical means.

Solution to Problem

The present invention was made to solve the problems and to achieve the object of the prior art as described above. An air intake duct structure is for a centrifugal fluid machine of the present invention including an impeller mounted to a rotation shaft and a housing for housing the impeller, and is configured to direct a fluid to a rotational center of the impeller housed in the housing via an intake duct portion of the housing protruding in an axial direction of the rotation shaft, the fluid flowing in a substantially orthogonal direction to the axial direction of the rotation shaft. Also the air intake duct structure comprises: an inflow part extending in the substantially orthogonal direction to the axial direction of the rotation shaft; and a transition part connecting the inflow part and the intake duct portion of the housing. The air intake duct structure has a virtual plane orthogonal to the axial direction of the rotation shaft and passing through a flow path cross-section of the inflow part, where an intersection of the virtual plane and an axial direction line of the rotation shaft is positioned within the transition part.

The air intake duct structure of the centrifugal fluid machine of the present invention is for introducing the fluid flowing in the substantially orthogonal direction with respect to the axial direction of the rotation shaft to the rotational center of the impeller, and has a virtual plane orthogonal to the axial direction of the rotation shaft and passing through a flow path cross-section of the inflow part, where an intersection of the virtual plane and an axial direction line of the rotation shaft is positioned within the transition part, as described above. With the above configuration, the air intake duct structure has a shape curved sharply just before the intake duct portion of the housing.

As a result, the flow of the fluid flowing toward the intake duct portion of the housing from the inflow part through the transition part (main flow) changes dramatically just before the intake duct portion, and thereby turbulence is caused in this main flow. At this time, the fluid, in which a swirl flow is caused by the impeller, flows in the reverse direction toward the upstream of the impeller because the pressure ratio is high when the flow rate is low. This reverse flow flows into the transition part, causing a swirl flow in the forward direction in the main flow where turbulence has occurred. On the other hand, the swirl flow due to the reverse flow does not occur when the flow rate is high because the pressure ratio is low and the flow speed of the main flow flowing in the transition part is high. Therefore, according to the air intake duct structure of the present invention, it is possible to avoid a surging by producing a swirl flow of the forward direction in the fluid introduced to the impeller only when the flow rate is low. Also, it is possible to secure a wide operating range without reducing the maximum flow rate of the operating range.

In the above invention, in a front view where the rotational center of the impeller is seen from its front, the air intake duct structure has a shape curved in a direction opposite to a rotational direction of the impeller from the inflow part toward the transition part. That is, in the case in which the impeller rotates in the clockwise direction, the air intake duct structure is curved to the left from the inflow part side toward the transition part side, and in the case in which the impeller rotates in the counterclockwise direction, the air intake duct structure is curved to the right from the inflow part side toward the transition part side, as seen in the front view.

With the air intake duct structure curved in the opposite direction to the rotational direction of the impeller, the main flow flowing through the air intake duct structure turns into a swirl flow of the reverse rotation with respect to the rotational direction of the impeller and then flows into the impeller when the flow rate is high. As a result, it is possible to increase the pressure ratio. On the other hand, when the flow rate is low, the influence of the above described reverse flow is stronger, and thus the fluid introduced into the impeller remains as the swirl flow of the forward direction. Therefore, according to the air intake duct structure of the present invention, it is possible to swirl the fluid introduced into the impeller in the reverse direction to increase the pressure ratio when the flow rate is high; and to swirl the fluid introduced into the impeller in the forward direction to avoid a surging when the flow rate is low. Also, it is possible to secure a wide operating range without reducing the maximum flow rate of the operating range.

Further, the above invention, the transition part may have at least a section configured to satisfy the following expression (1):

$$A3 > A1 - (A1 - A2) \times L1/L \quad (1)$$

where $0 < L1 < L$, L is an entire length of the transition part, A1 is a flow path cross-sectional area of one end of the transition part connected to the inflow part, A2 is a flow path cross-sectional area of other end of the transition part connected to the intake duct portion, and A3 is a flow path cross-sectional area of the transition part at a position distanced from the one end of the transition part by a distance L1.

With the above configuration, a section with a larger flow path cross-section is formed between one end and the other end of the transition part. Thus, the reverse flow easily reaches the upstream side of the transition part when the flow rate is low. As a result, it is possible to produce an even stronger swirl flow of the forward direction with respect to the main flow.

Further, in the above invention, with the flow path cross-section of one section of the transition part having a non-circular shape, the reverse flow even more easily reaches the upstream side of the transition part when the flow rate is low. This is preferable because an even stronger swirl flow of the forward direction is caused by the main flow.

The air intake duct structure of the present invention for a centrifugal fluid machine with the above configuration can be suitably used in particular as a centrifugal compressor for an automobile turbocharger.

Advantageous Effects

According to the present invention, it is possible to provide an air intake duct structure capable of: swirling the fluid introduced into the impeller in the reverse direction to increase the pressure ratio when the flow rate is high; and swirling the fluid in the forward direction to avoid a surging when the flow rate is low, as well as securing a wide operating range, by improving the shape and the like of the air intake duct and without using a mechanical means.

BRIEF DESCRIPTION OF DRAWINGS

FIG. 2A is a side view where the rotational axis line is seen from the side. FIG. 2B is a front view where the impeller is seen from the front.

FIG. 3A is a side view where the rotational axis line is seen from the side. FIG. 3B is a front view where the impeller is seen from the front.

FIGS. 4A and 4B are schematic diagrams of the flow of the fluid in the air intake duct structure of the present invention.

FIG. 11A is a side view where the rotational axis line is seen from the side.

FIG. 11B is a front view where the impeller is seen from the front.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not limitative of the scope of the present invention.

Although the following description illustrates a case where the present invention is applied to an air intake duct structure of a centrifugal compressor of an automobile turbocharger, the usage of the present invention is not limited to this.

Figure 1:
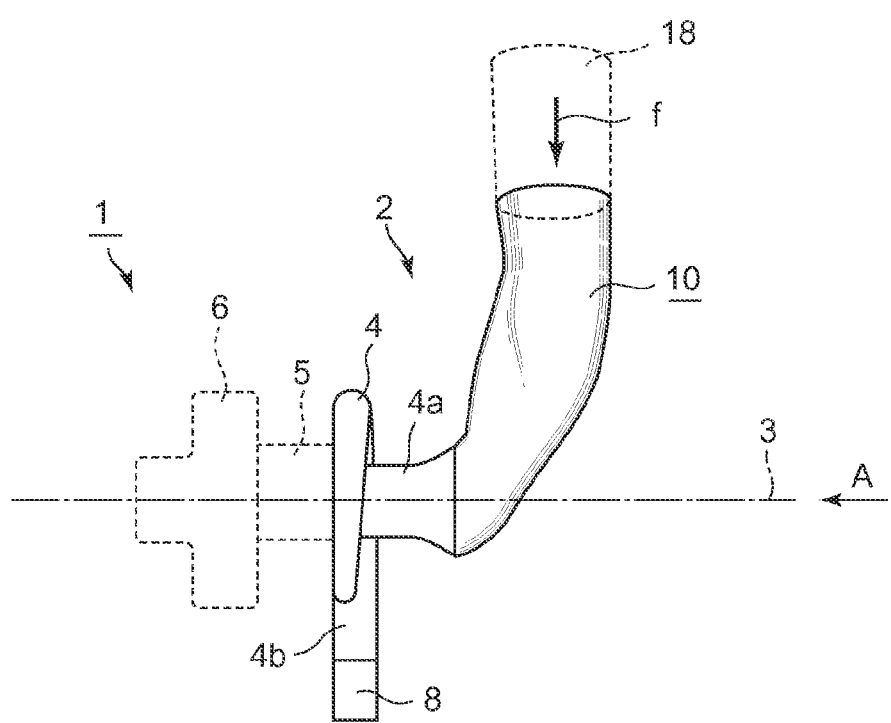
FIG. 1 is a schematic diagram of a centrifugal compressor of an automobile turbocharger, to which the air intake duct structure of the present invention is applied.

FIG. 1 is a schematic diagram of a centrifugal compressor of an automobile turbocharger, to which the air intake duct structure of the present invention is applied, showing one embodiment of the present invention. As shown in FIG. 1, this automobile turbocharger 1 includes a compressor housing 4 (housing) where a compressor rotor (impeller) is housed, a bearing housing 5 where a rotation shaft is housed, and a turbine housing 6 where a turbine rotor is housed. The compressor rotor and the turbine rotor are coaxially mounted to the rotational shaft. Thus, by the turbine rotor being rotated by the exhaust gas flowed into the turbine housing 6, the compressor rotor mounted coaxially is also rotated.

An intake duct portion 4a is provided on the front face (the face as seen in the direction A of FIG. 1) of the compressor housing 4 so as to protrude in the axial direction of the rotation shaft. The air intake duct structure 10 of the present invention is connected to the intake duct portion 4a. Further, an intake path 18 extending in the substantially orthogonal direction with respect to the rotational axis line 3 (the axial direction line of the rotation shaft) is connected to the air intake duct structure 10. Also, an exhaust pipe 8 is connected to a scroll part 4b extending in the circumferential direction of the compressor housing 4. The centrifugal compressor 2 of the present embodiment includes these compressor housing 4, exhaust pipe 8 and air intake duct structure 10. By the compressor rotor rotating, a fluid "f" such as the air running through the intake path 18 flows through the air intake duct structure 10, and then introduced to the front face of the compressor rotor housed in the compressor housing 4 via the intake duct portion 4a.

Next, the air intake duct structure for the centrifugal compressor of the present invention will be described in detail in comparison with a comparative example.

Figure 2A:
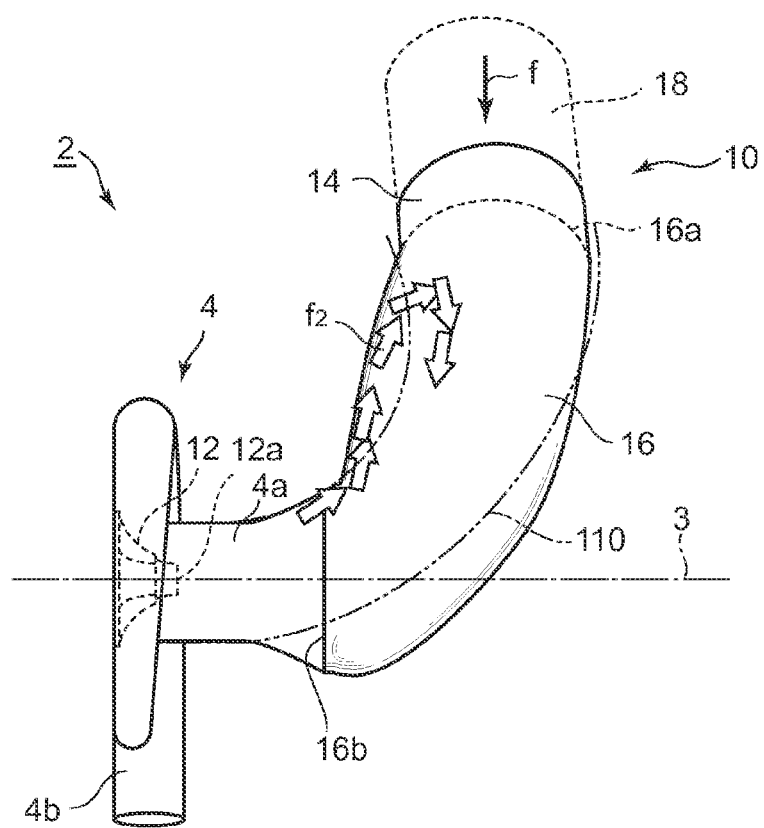
FIGS. 2A and 2B are diagrams of the air intake duct structure of the present invention.
Figure 2B:
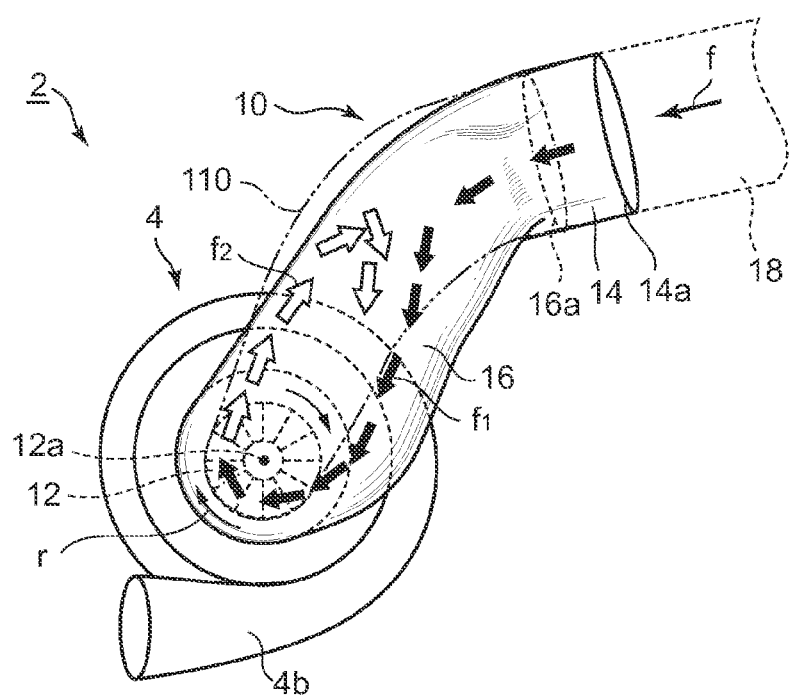
Figure 2C:
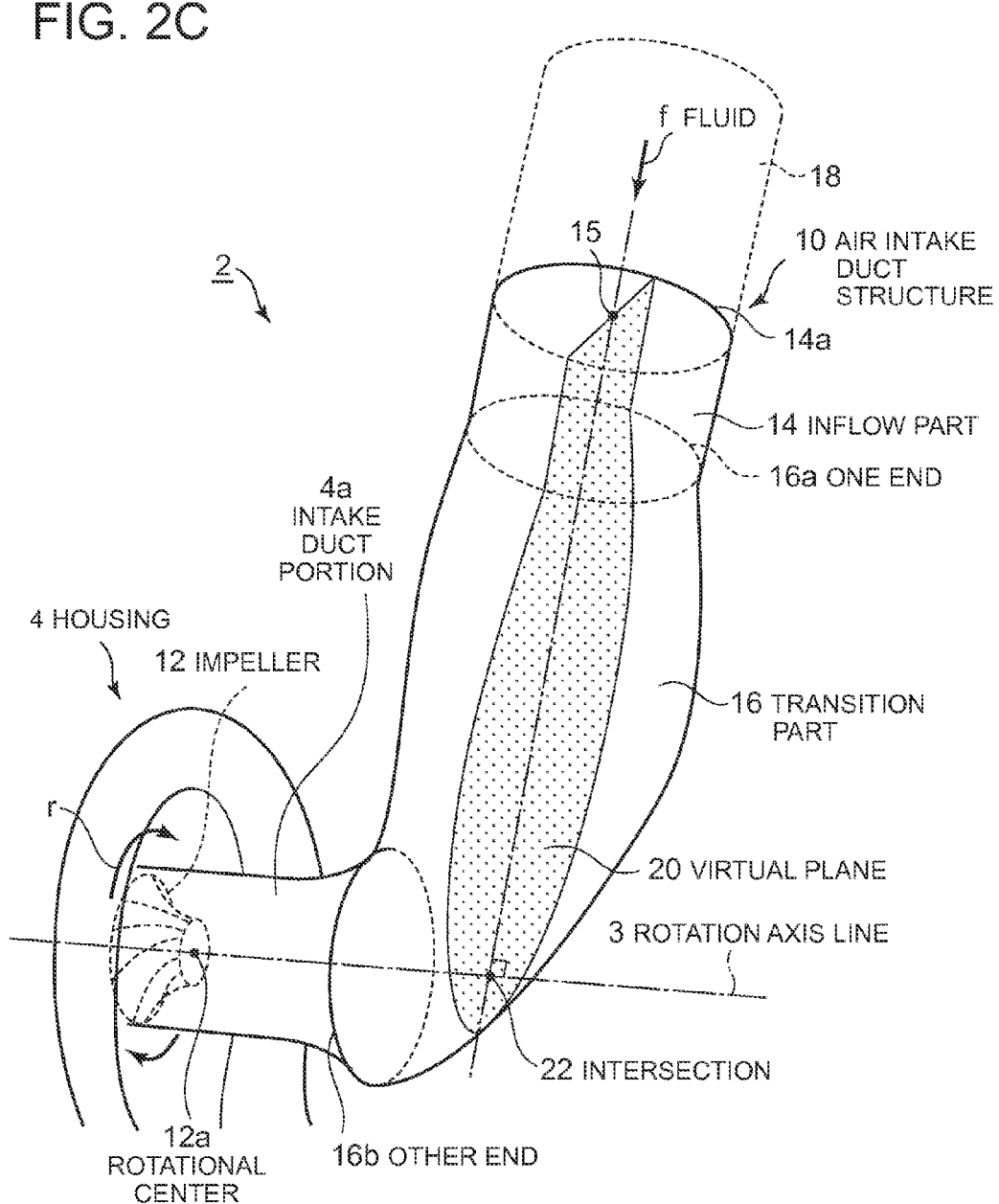
FIG. 2C is a perspective view of the air intake duct structure of the present invention.

FIGS. 2A and 2B are diagrams of the air intake duct structure of the present invention. FIG. 2A is a side view where the rotational axis line is seen from the side. FIG. 2B is a front view where the compressor rotor is seen from the front. FIG. 2C is a perspective view of the air intake duct structure of the present invention. Herein, the arrows f1, f2 in FIG. 2A and FIG. 2B respectively represent the flowing directions of the main flow f1 and the reverse flow f2 as of the time when the flow rate is low, and the two-dot chain line 110 in FIG. 2A and FIG. 2B represents the shape of the air intake duct structure 110 of the comparative example.

Figure 3A:
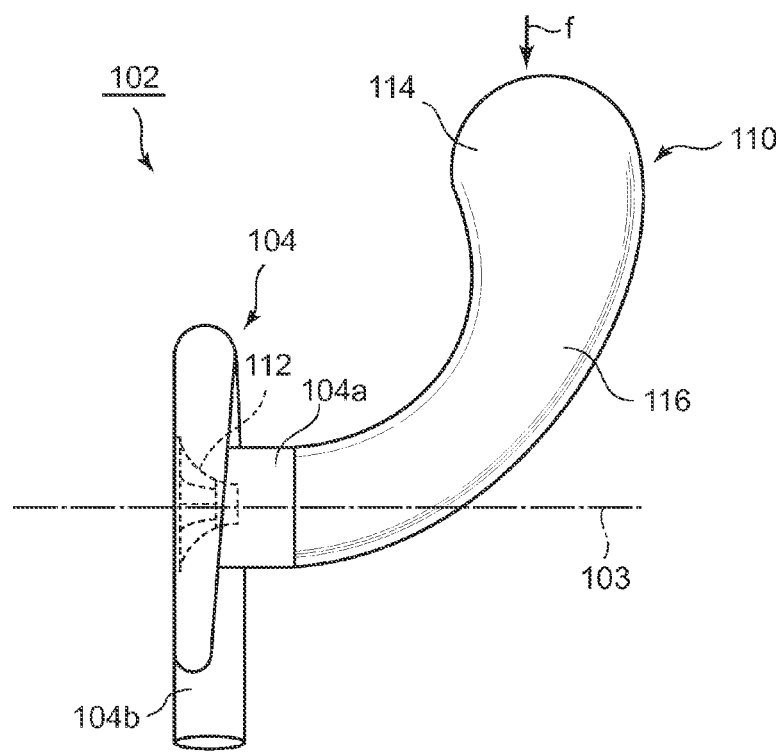
FIGS. 3A and 3B are diagrams of the air intake duct structure of a comparative example.
Figure 3B:
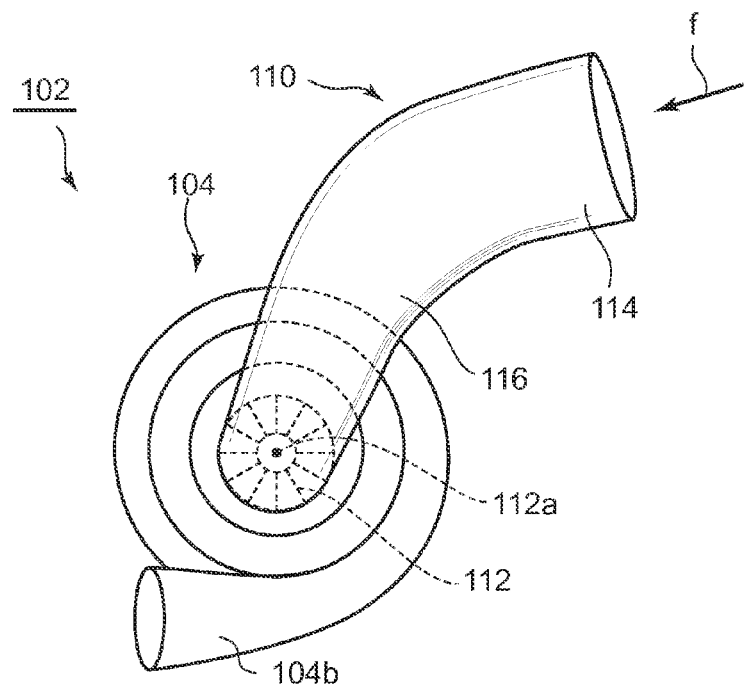
Figure 3C:
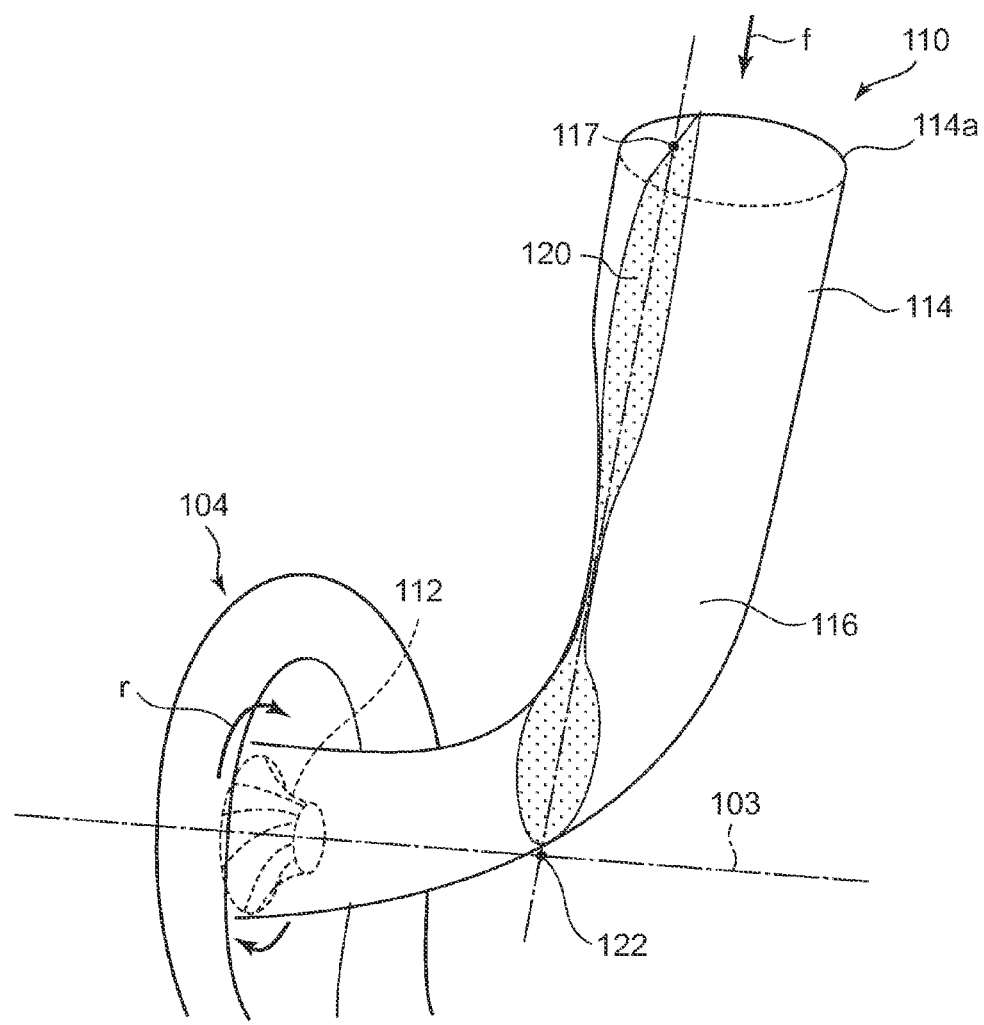
FIG. 3C is a perspective view of the air intake duct structure of the comparative example.

Further, FIGS. 3A and 3B are diagrams of the air intake duct structure of a comparative example. FIG. 3A is a side view where the rotational axis line is seen from the side. FIG. 3B is a front view where the impeller is seen from the front. FIG. 3C is a perspective view of the air intake duct structure of a comparative example. The air intake duct structure 110 of the comparative example was designed by the inventors of the present invention based on the general design concept for the conventional air intake duct structure, as an air intake duct structure capable of introducing the fluid "f" running in the substantially orthogonal direction with respect to the rotational axis line 103 into the rotational center 112a of the compressor rotor 112 quickly and with the least possible loss.

As shown in FIGS. 2A to 2C, the air intake duct structure 10 of the present invention includes an inflow part 14 connected to the above described intake path 18. The air intake duct structure 10 also includes a transition part 16 having one end 16a connected to the inflow part 14 and the other end 16b connected to an opening end of intake duct portion 4a of the compressor housing 4. Also, as shown in 2B with the arrow "r", the compressor rotor 12 housed in the compressor housing 4 is housed so as to rotate in the clockwise direction "r" around the rotational center 12a of the compressor rotor 12 in the front view.

The inflow part 14 extends straight in the substantially orthogonal direction with respect to the rotational axis line 3, without changing its flow path cross-section. Herein, "substantially orthogonal" means the case in which the intersection angle of the extending direction of the inflow part 14 and the rotational axis line 3 is generally an angle close to the right angle, which is specifically an angle in the range from 75 degrees to 105 degrees. On the other hand, the one end 16a of the transition part 16 is arranged substantially horizontal with respect to the rotational axis line 3 and the other end 16b is arranged vertical with respect to the rotational axis line 3. The flow path cross-section of the transition part 16 is formed to be expanded in an intermediate section.

Also shown in FIGS. 2A and 2B, as seen in the side view, the air intake duct structure 10 of the present invention has a shape bulging toward both of the outer and inner sides of the curved portion in the side view, compared to the air intake duct structure 10 of the comparative example. Moreover, in the front view, the air intake duct structure 10 has a shape bulging toward the inner side of the curved portion the front view.

As shown in FIG. 2C, the air intake duct structure 10 of the present invention has a virtual plane 20 orthogonal to the rotational axis line 3 and passing through the flow path cross-section of the inflow part 14, where an intersection 22 of the virtual plane 20 and the rotational axis line 3 is positioned within the transition part 16. The virtual plane 20 of FIG. 2C passes through the center 15 at the upstream end 14a of the inflow part 14. In contrast, as shown in FIG. 3C, the air intake duct structure 110 of the comparative example does not have a virtual plane orthogonal to the rotational axis line 103 and passing through the inflow cross-section of the inflow part 114, where an intersection 122 of virtual plane the rotational axis line 103 is positioned within the transition part 116. As shown in FIG. 3C, even in the closest virtual plane 120 to the compressor housing 104, an intersection 122 of the virtual plane 120 and the rotational axis line 103 is positioned outside of the transition part 116.

Figure 5:
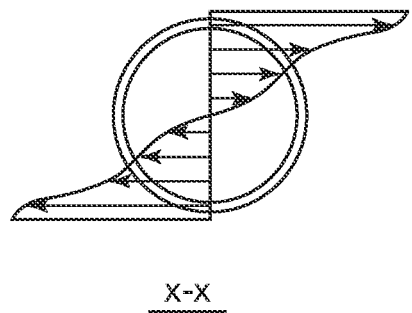
FIG. 5 is an illustration of the velocity vector distribution of the fluid in the cross-section taken along the line x-x of FIG. 4A.

With the above configuration, the transition part 16 of the air intake duct structure 10 of the present invention has a sharp curve just before the intake duct portion 4a, compared to that of the air intake duct structure 110 of the comparative example. Thus, as schematically shown in FIGS. 4A and 4B, the flow of the fluid (main flow f1), which flows in from the intake path 18, and then flows through the transition part 16 from the inflow part 14 toward the intake duct portion 4a of the compressor housing 4, changes dramatically just before the intake duct portion 4a. As a result, turbulence occurs in the above main flow f1. At this time, the fluid flowing into the compressor housing 4 hits the surface of the compressor rotor 12 and thus a swirl flow (reverse flow f2) occurs, because the pressure ratio is high in the case of low flow rate shown in FIG. 4A. The reverse flow f2 flows into the transition part 16. In the present embodiment, the reverse flow f2 flows into the bulged portion at the inner side of the curved portion of the transition part 16 in the side view, as shown in FIG. 2A. Then, the reverse flow f2 causes the fluid f1 flowing into the compressor housing 4 to produce a swirl flow in the forward direction. Herein, FIG. 5 is an illustration of the velocity vector distribution of the fluid in the cross-section taken along the line x-x of FIG. 4A.

On the other hand, in the case of high flow rate shown in FIG. 4, the pressure ratio is low and the flow speed of the main flow f1 flowing through the transition part 16 is high. Thus, a swirl flow due to the reverse flow f2 does not occur. The main flow f1 is straightly introduced toward the rotational center 12 of the compressor rotor 12. That is, in the air intake duct structure 10 of the present invention, a swirl flow in the forward direction occurs in the fluid introduced to the compressor housing 4 only when the flow rate is low.

Also, as shown in FIG. 2B, the air intake duct structure 10 of the present invention has such a shape in the front view that curves toward the other end 16b side of the transition part 16 from the inflow part 14 side in the opposite direction to the rotational direction "r" of the compressor rotor 12, that is, the counterclockwise direction.

Figure 6A:
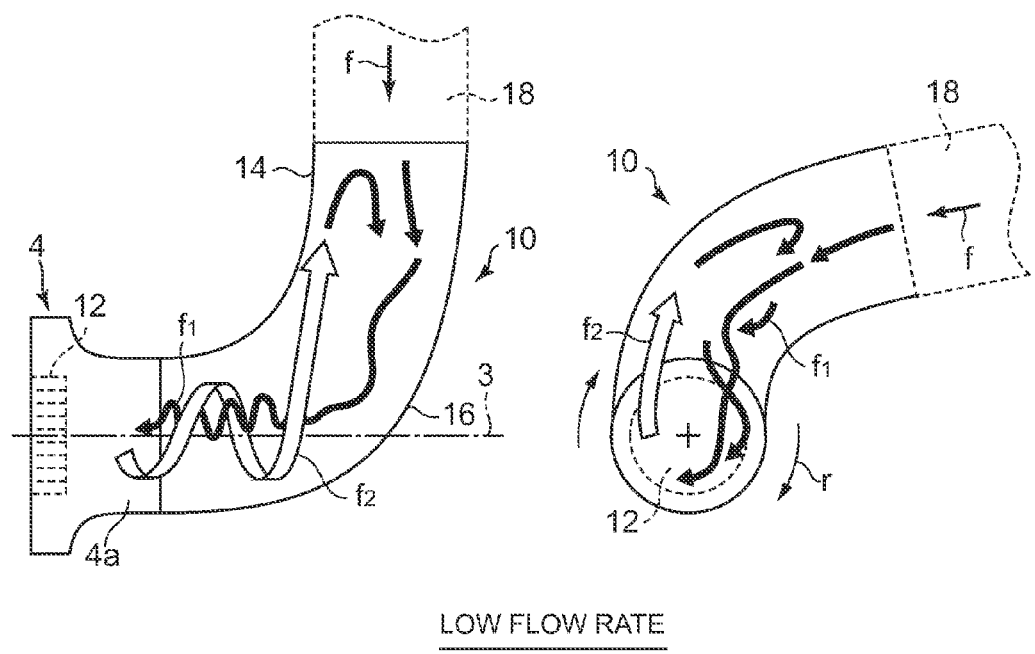
FIGS. 6A and 6B are schematic diagrams of the flow of the fluid in the air intake duct structure of the present invention.
Figure 6B:
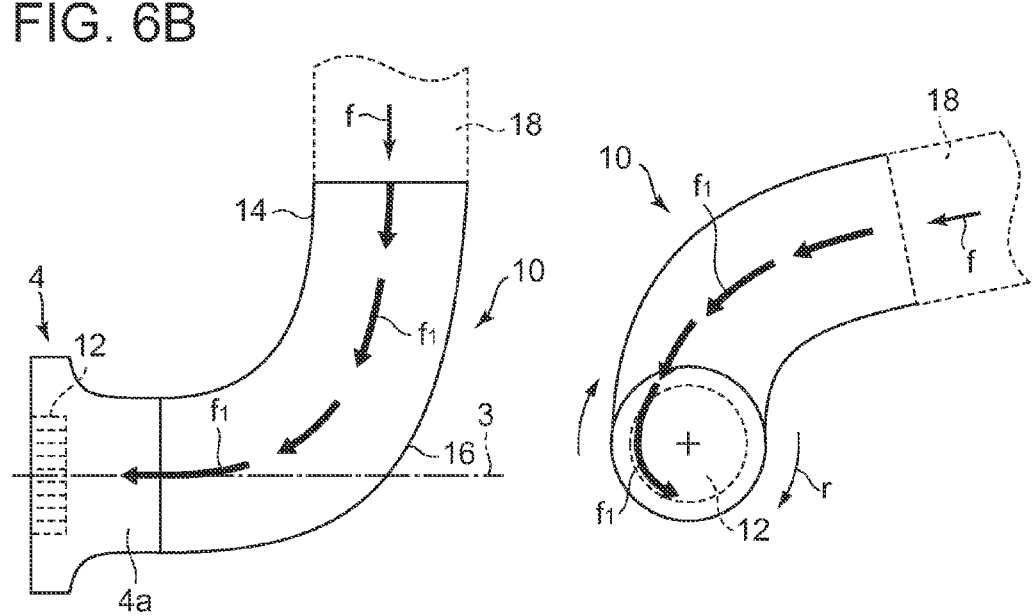

With the air intake duct structure 10 curving in the opposite direction to the rotational direction of the compressor rotor 12, the main flow f1 flows as illustrated in FIGS. 6A and 6B: in the case of high flow rate shown in FIG. 6B, the main flow f1 flowing through the air intake duct structure 10 becomes a swirl flow of the reverse rotation with respect to the rotational direction "r" of the compressor rotor 12 and then flows in to the compressor rotor 12; on the other hand, in the case of low flow rate shown in FIG. 6A, the main flow f1 introduced into the compressor rotor 12 remains as the swirl flow of the forward direction because the above described reverse flow f2 has stronger influence.

Accordingly, with the air intake duct structure 10, it is possible to swirl the fluid introduced into the compressor rotor 12 in the reverse direction when the flow rate is high and swirl the fluid introduced into the compressor rotor 12 in the forward direction when the flow rate is low without using mechanical means. Thus, it is possible to provide an air intake duct structure 10 capable of: swirling the fluid introduced into the compressor rotor 12 in the reverse direction to increase the pressure ratio when the flow rate is high; and swirling the fluid introduced into the compressor rotor 12 in the forward direction to avoid a surging when the flow rate is low, as well as securing a wide operating range.

In contrast, in the air intake duct structure 110 of the comparative example shown in FIGS. 3A to 3C, a swirl flow of the reverse rotation with respect to the rotational direction "r" of the compressor rotor 112 flows into the compressor rotor 112 in both cases of the high flow rate and the low flow rate. Thus, while it is possible to increase the pressure ratio when the flow rate is high, a surging is likely to occur when the flow rate is low. Also, it is impossible to secure a wide operating range.

Figure 7:
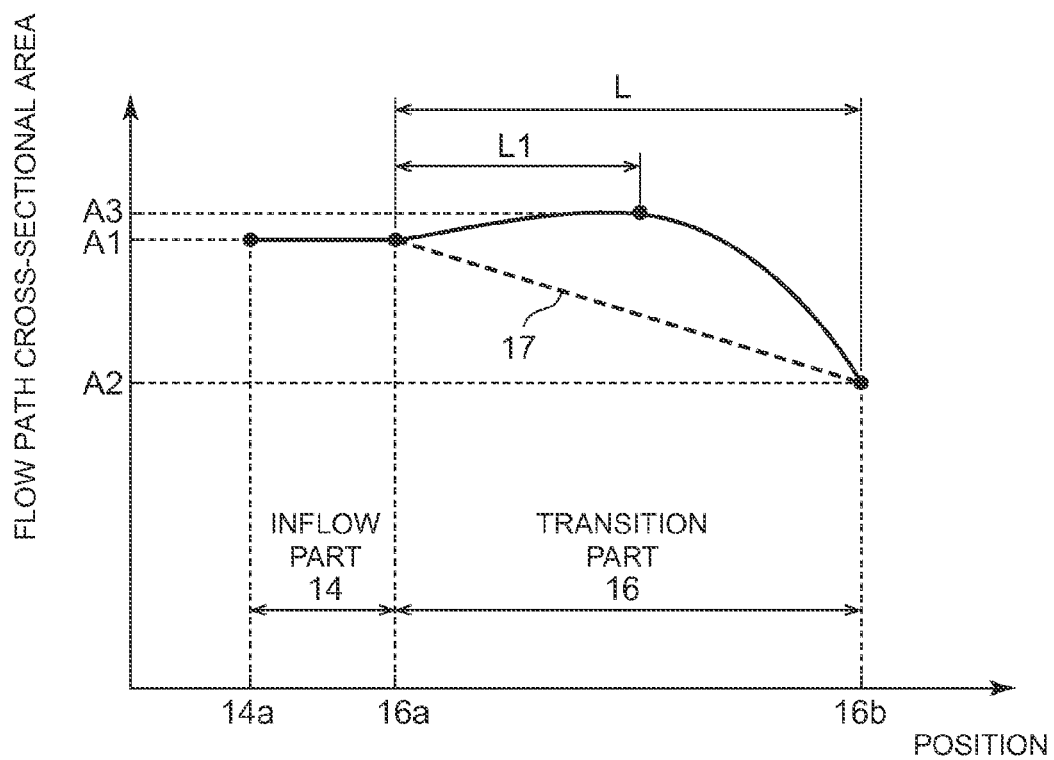
FIG. 7 is a graph of the flow path cross-sectional area of the air intake duct structure of the present invention.

Further, in the air intake duct structure 10 of the present invention, the flow path cross-section of the transition part 16 changes so as to satisfy the following expression (1) as shown in FIG. 7, while the flow path cross-section of the inflow part 14 does not change. Herein, FIG. 7 is a graph of the flow path cross-sectional areas of the air intake duct structure 10 at various positions. In the following expression (1), L is the entire length of the transition part 16, A1 is the flow path cross-sectional area of one end 16a of the transition part 16, A2 is the flow path cross-sectional area of other end 16b of the transition part 16, and A3 is the flow path cross-sectional area of the transition part 16 at a position distanced from the one end 16a of the transition part 16 by a distance L1.

$$A3 > A1 - (A1 - A2) \times L1/L \quad (0 < L1 < L) \qquad \text{Expression (1)}$$

Figure 8A:
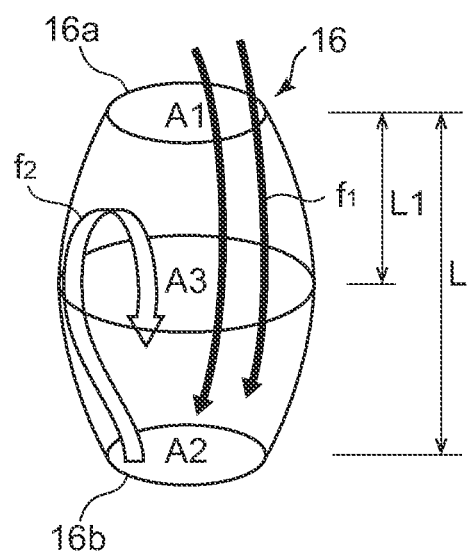
FIGS. 8A and 8B are schematic diagrams for describing the flow path cross-section at the transition part of the air intake duct structure of the present invention.
Figure 8B:
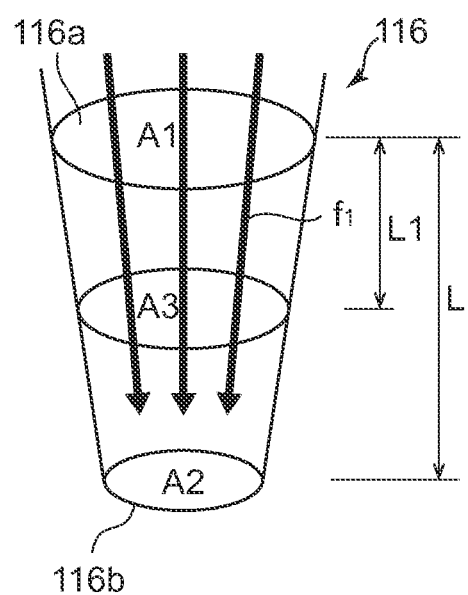

As shown in FIG. 7, the flow path cross-sectional area. A3 at the position distanced from the one end 16a of the transition apart 16 by the distance L1 is larger than the cross-sectional area indicated by the dotted line 17 in the drawing. That is, the transition part 16 of the present invention has a shape bulging like a barrel as illustrated in FIG. 8A, where the flow path cross-section between the one end 16a and the other end 16b is expanded. In contrast, in the transition part 116 of the comparative example, the flow path cross-sectional area A1 of the one end 116a is the largest and the flow path cross-sectional area decreases in size toward the other end 116b, as illustrated in FIG. 8B.

With the transition part 16 of the present invention, there is a section where the flow path cross-section between the one end 16a and the other end 16b is expanded. Thus, the reverse flow f2 reaches the upstream side of the transition part 16 more easily when the flow rate is low as illustrated in FIG. 8A. As a result, it is possible to cause a stronger swirl flow of the forward direction in the main flow f1.

Figure 9:
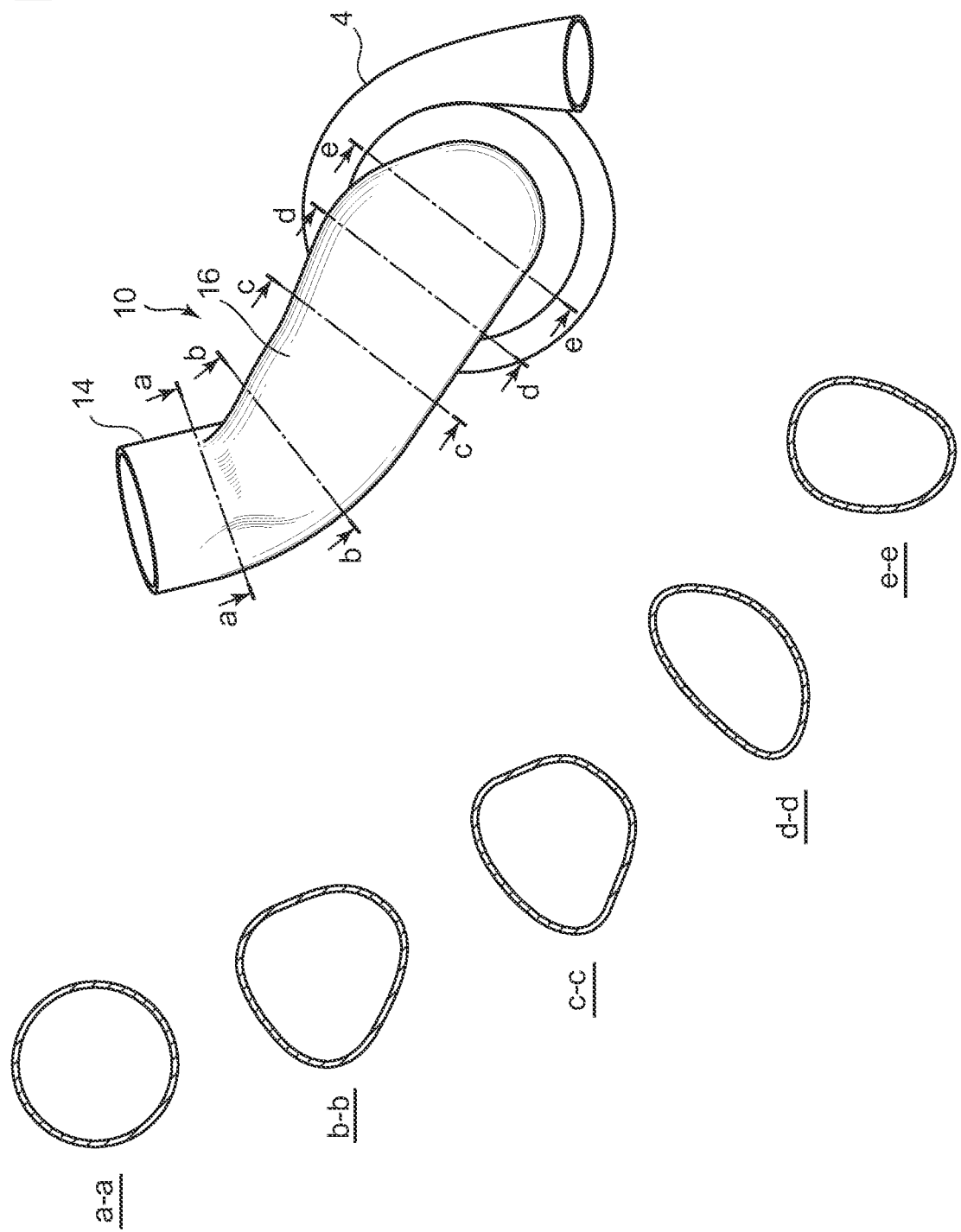
FIG. 9 is a diagram of the cross-sections of the air intake duct structure of the present invention.
Figure 10:
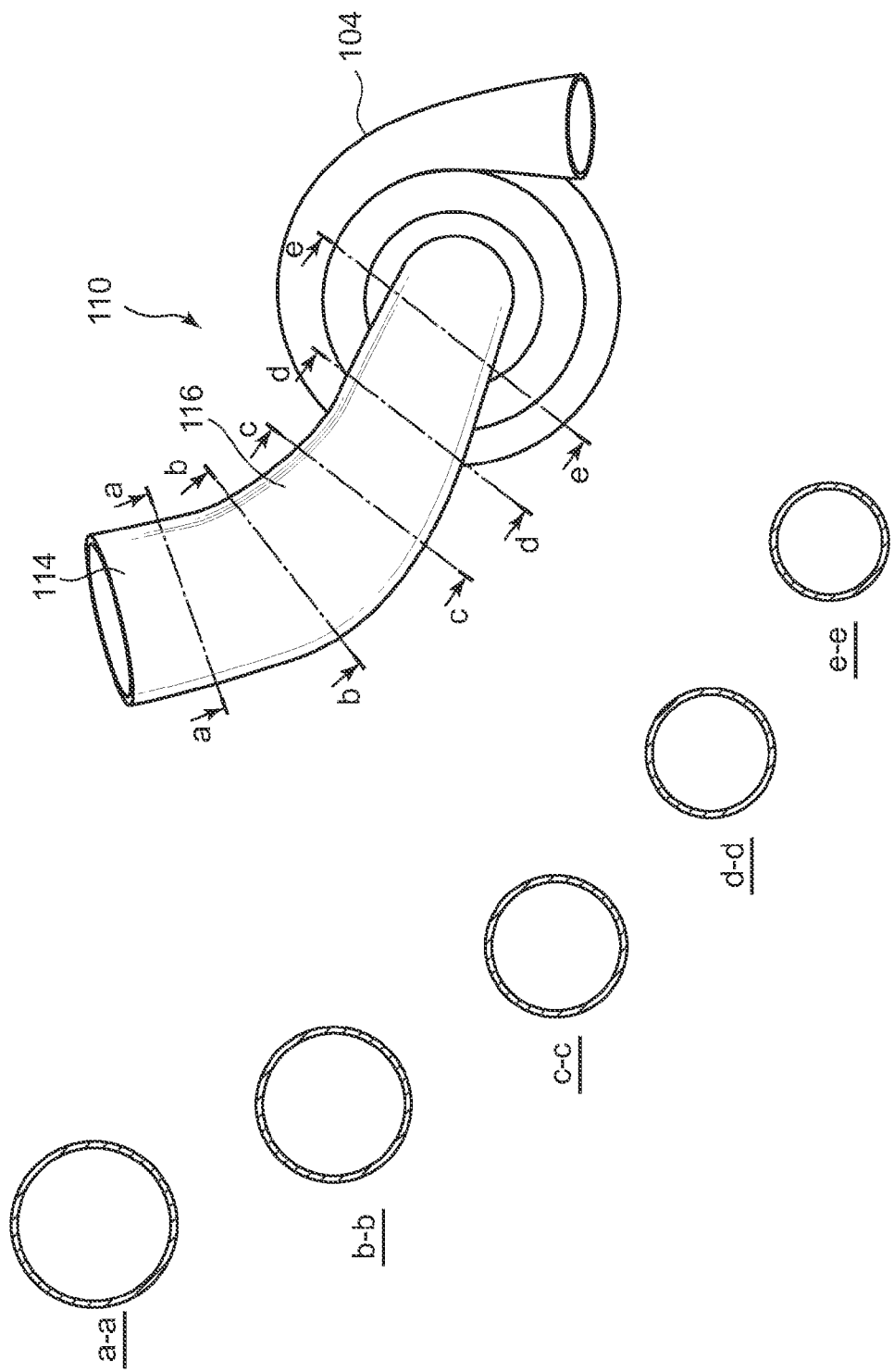
FIG. 10 is a diagram of the cross-sections of the air intake duct structure of the comparative example.

Further, as shown in FIG. 9, in the air intake duct structure 10 of the present invention, the flow path cross-section of the transition part 16 has a non-circular shape. In contrast, in the air intake duct structure 110 of the comparative example, the flow path cross-section of not only the inflow part 114 but also the transition part 16 has a circular shape as shown in FIG. 10.

With the flow path cross-section of the transition part 16 having a non-circular shape, the loss of the fluid flowing through the transition part 16 becomes larger compared to the case where the flow path cross-section of the transition part 116 has a circular shape as in the comparative example. As a result, the main flow f1 becomes more likely to produce turbulence by the amount of the increased loss. Thus, the reverse flow f2 reaches the upstream side of the transition part 16 even more easily when the flow rate is low, and thus a stronger swirl flow of the forward direction is caused in the main flow f1. Herein, the flow path cross-section of a non-circular shape may not be formed throughout the entire region of the transition part 16, and may be formed in at least a section of the transition part 16. Further, in this configuration, with the flow path cross-section having a non-circular shape in at least a section satisfying the above expression (1), the reverse flow f2 reaches the upstream of the transition part 16 more easily, which is effective in causing a stronger swirl flow of the forward direction by the main flow f1.

As described above, the air intake duct structure 10 of the present invention is capable of swirling the fluid introduced into the compressor rotor 12 in the reverse direction to increase the pressure ratio when the flow rate is high; and swirling the fluid introduced into the compressor rotor 12 in the forward direction to avoid a surging when the flow rate is low as well as securing a wide operating range, by improving the shape and the like of the air intake duct and without using a mechanical means. The air intake duct structure 10 of the present invention may be suitably applied in particular to an automobile turbocharger, which is subject to a strong need for downsizing and cost-reduction of the device.

Embodiments of the present invention were described in detail above, but the present invention is not limited thereto, and various amendments and modifications may be implemented within a scope that does not depart from the object of present invention.

Figure 11A:
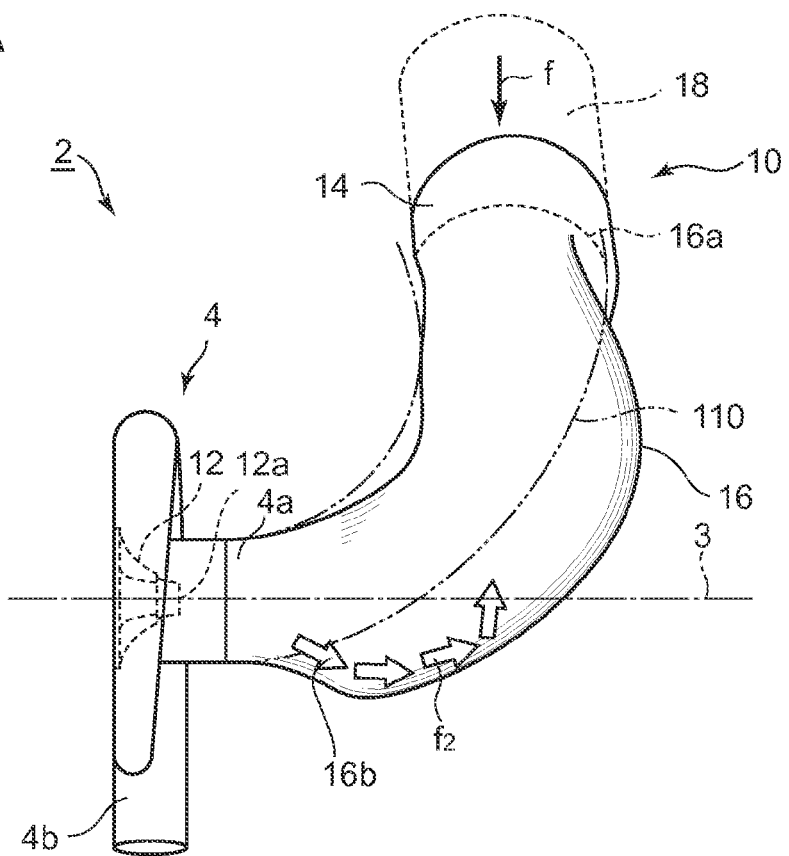
FIGS. 11A and 11B are diagrams of the air intake duct structure of another embodiment of the present invention.
Figure 11B:
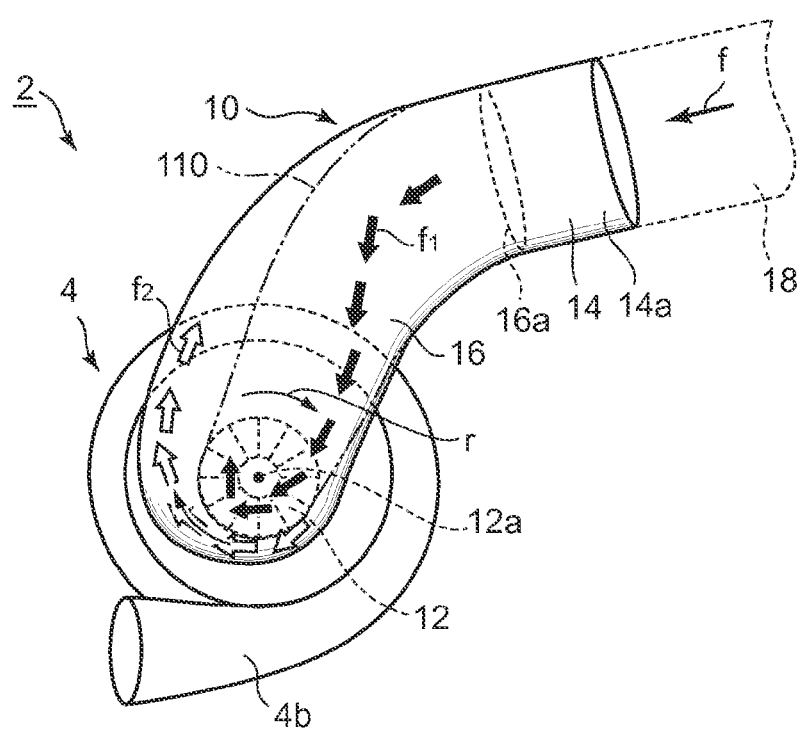
Figure 11C:
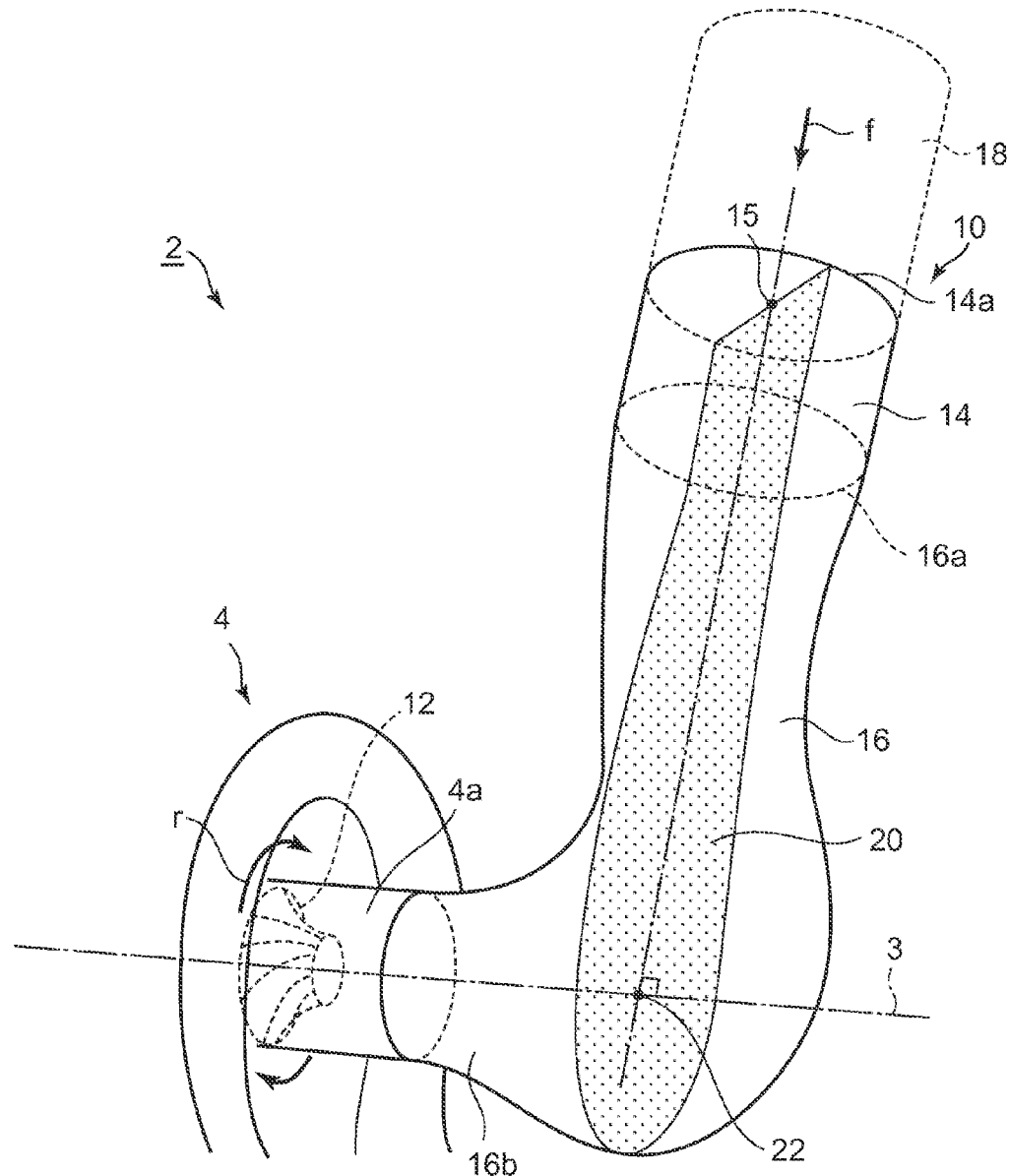
FIG. 11C is a perspective view of the air intake duct structure of another embodiment of the present invention.

For instance, FIGS. 11A and 11B are diagrams of the air intake duct structure of another embodiment of the present invention. FIG. 11A is a side view where the rotational axis line is seen from the side. FIG. 11B is a front view where the compressor rotor is seen from the front. FIG. 11C is a perspective view of the air intake duct structure of another embodiment of the present invention. Herein, the arrows f1, f2 in FIGS. 11A and 11B respectively represent the flowing directions of the main flow f1 and the reverse flow f2 as of the time when the flow rate is low. The air intake duct structure of this another embodiment has a basically similar configuration to the above described embodiment. Thus, the same component is associated with the same reference sign to omit its detailed description.

As shown in FIG. 11C, the air intake duct structure of this another embodiment has a virtual plane 20 orthogonal to the rotational axis line 3 and passing through the flow path cross-section of the inflow part 14, where an intersection 22 of the virtual plane 20 and the rotational axis line 3 is positioned within the transition part 16 similarly to the above described embodiment. The virtual plane 20 in FIG. 11C passes through the center 15 at the upstream end 14a of the inflow part 14. However, this another embodiment differs from the above described embodiment in that the curved portion in the side view is bulging outward to a great extent. As shown in FIG. 11A the reverse flow f2 flows into the outer side of the bulged portion in the side view when the flow rate is low. In the front view, similarly to the above described embodiment, the reverse flow f2 flows into the outer side of the curved portion in the front view so that the main flow f1 flows through the inner side of the curved portion in the front view as shown in FIG. 11B.

The air intake duct structure 10 of this another embodiment of the present invention with the above configuration is, similarly to the above described embodiments, capable of swirling the fluid introduced into the compressor rotor 12 in the reverse direction to increase the pressure ratio when the flow rate is high; and swirling the fluid introduced into the compressor rotor 12 in the forward direction to avoid a surging when the flow rate is low, as well as securing a wide operating range.

Figure 12:
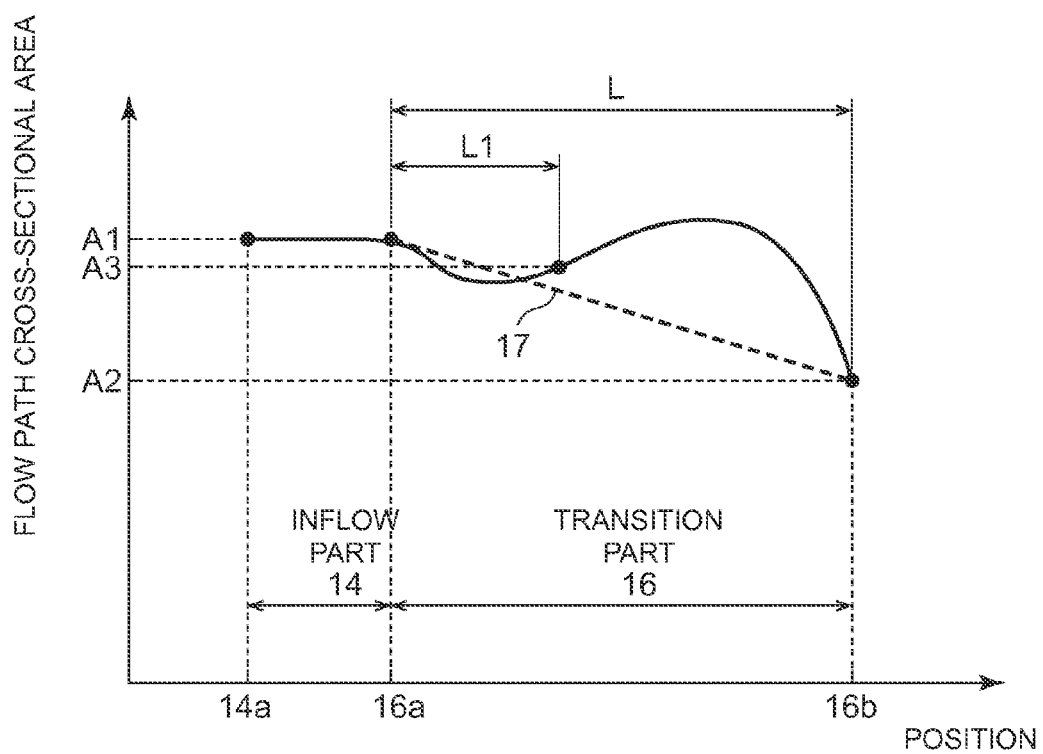
FIG. 12 is a graph of the flow path cross-sectional area of the air intake duct structure of another embodiment of the present invention.
Figure 13A:
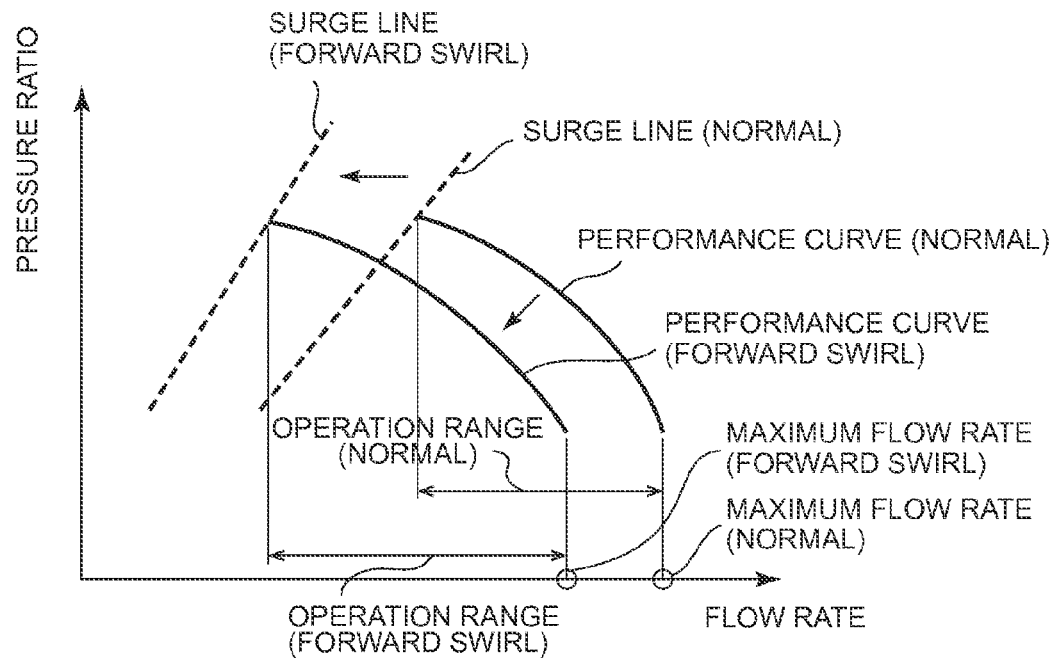
FIG. 13A is a graph showing the change in the performance characteristic of the compressor when the rotation speed is constant and the fluid introduced into the impeller is swirled in the forward direction.
Figure 13B:
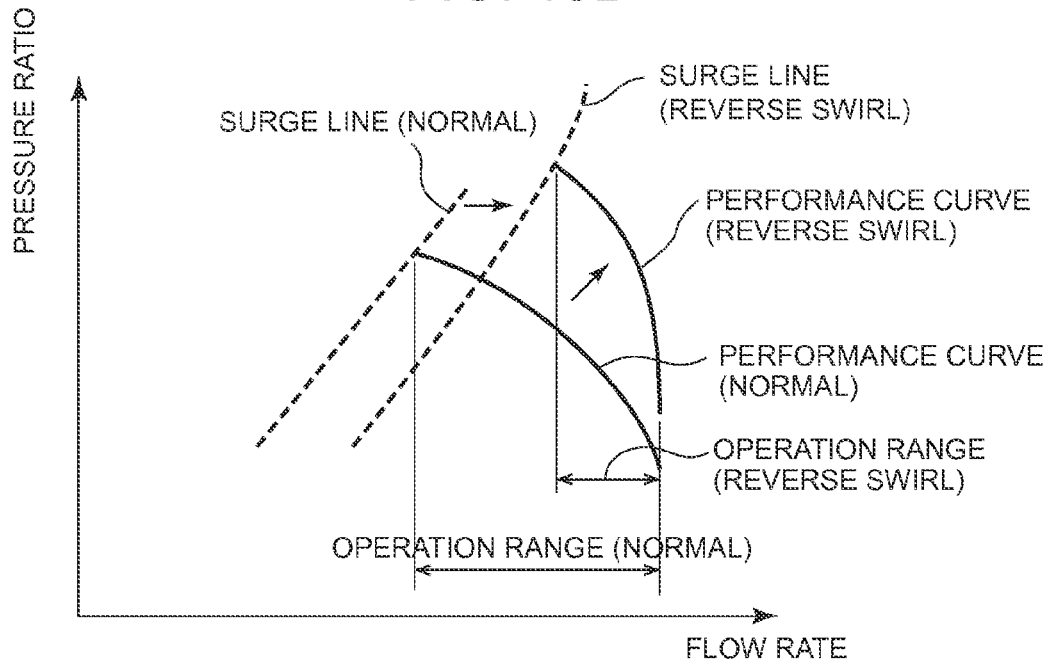
FIG. 13B is a graph showing the change in the performance characteristic of the compressor when the rotation speed is constant and the fluid introduced into the impeller is swirled in the reverse direction.
Figure 14:
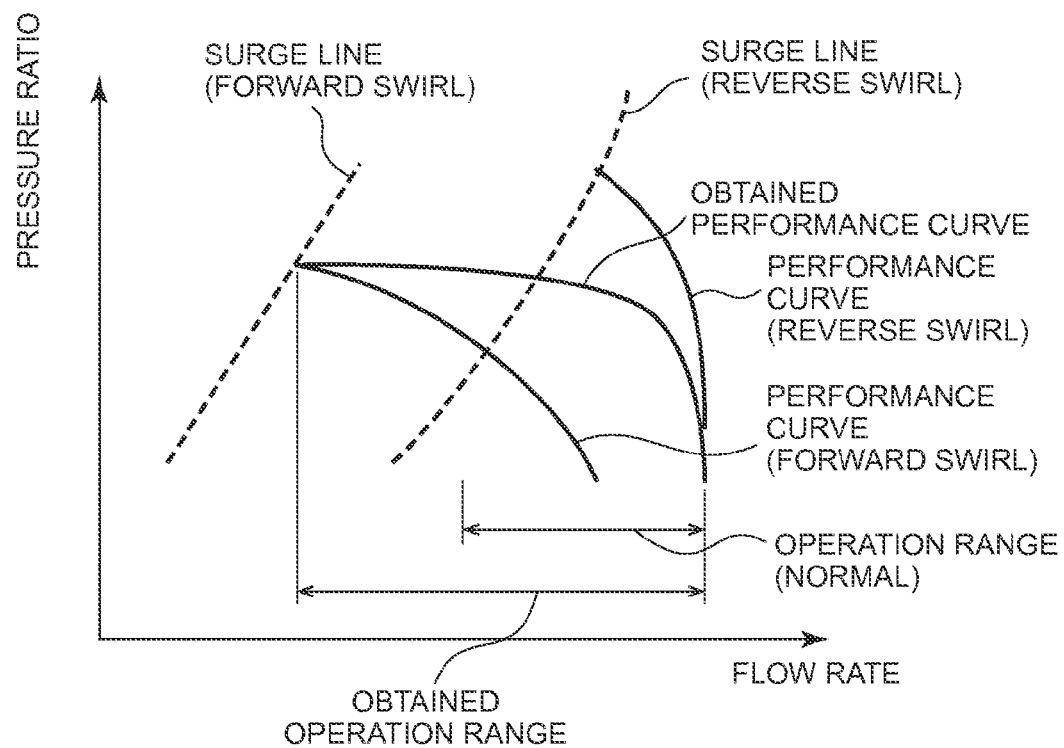
FIG. 14 is a graph showing the change in the performance characteristic of the compressor when the fluid introduced into the impeller is swirled in the forward direction upon low flow rate and the fluid introduced into the impeller is swirled in the reverse direction upon high flow rate.

Also, as shown in FIG. 12, the flow path cross-section of the transition part 16 satisfies the relation of the above expression (1) at least in a section on the other end 16b side.

In this manner, the reverse flow f2 easily reaches at least the section satisfying the above expression (1) when the flow rate is low. As a result, it is possible to cause a stronger swirl flow of the forward direction in the main flow f1 similarly to the above described embodiment.

Industrial Applicability

The present invention can be suitably used as the air intake duct structure of the centrifugal fluid machine such as the centrifugal compressor and the centrifugal blower, for instance, the centrifugal compressor for the turbocharger or turbo freezer installed on a vehicle or ship.

The invention claimed is:

1. A centrifugal fluid machine comprising:
an impeller mounted to a rotation shaft;
a housing for housing the impeller, the housing having a scroll part extending in the circumferential direction of the housing; and
an air intake duct structure being configured to direct a fluid to a rotational center of the impeller housed in the housing via an intake duct portion of the housing protruding in an axial direction of the rotation shaft, the fluid flowing in a substantially orthogonal direction to the axial direction of the rotation shaft,
wherein the centrifugal fluid machine is configured to:
compress the fluid directed to the rotational center of the impeller; and discharge the fluid to the scroll part,
wherein the air intake duct structure comprises;
an inflow part extending in the substantially orthogonal direction to the axial direction of the rotation shaft; and
a transition part connecting the inflow part and the intake duct portion of the housing,
the air intake duct structure having a virtual plane orthogonal to the axial direction of the rotation shaft and passing through a flow path cross-section of the inflow part, where an intersection of the virtual plane and an axial direction line of the rotation shaft is positioned within the transition part, and
wherein, in a front view where the rotational center of the impeller is seen from its front, the air intake duct structure has a shape curved in a direction opposite to a rotational direction of the impeller from the inflow part toward the transition part.

2. The centrifugal fluid machine according to claim 1, wherein the transition part has at least a section configured to satisfy a following expression (1):

$$A3 > A1 - (A1 - A2) \times L1/L \qquad (1)$$

where $0 < L1 < L$, L is an entire length of the transition part, A1 is a flow path cross-ectional area of one end of the transition part connected to the inflow part, A2 is a flow path cross-sectional area of other end of the transition part connected to the intake duct portion, and A3 is a flow path cross-sectional area of the transition part at a position distanced from the one end of the transition part by a distance L1.

3. The centrifugal fluid machine according to claim 2, wherein the transition part has a section having a flow path cross-section of a non-circular shape.

4. The centrifugal fluid machine according to claim 1, wherein the centrifugal fluid machine is a centrifugal compressor of an automobile turbocharger.

5. The centrifugal fluid machine according to claim 1, wherein a flow path cross-section of the inflow part has an unchanging circular shape.

* * * * *